US010021608B2

(12) United States Patent
Axelsson et al.

(10) Patent No.: US 10,021,608 B2
(45) Date of Patent: Jul. 10, 2018

(54) RADIO NETWORK NODE, AND METHOD FOR DETERMINING WHETHER A WIRELESS DEVICE IS A SUITABLE CANDIDATE FOR HANDOVER TO A TARGET CELL FOR LOAD BALANCING REASONS

(71) Applicant: Telefonaktiebolaget LM Ericsson (publ), Stockholm (SE)

(72) Inventors: Håkan Axelsson, Linköping (SE); Samuel Axelsson, Linköping (SE); Fredrik Gunnarsson, Linköping (SE); Stefan Johansson, Linköping (SE); Parisa Pakniat, Norrköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/329,461

(22) PCT Filed: Aug. 8, 2014

(86) PCT No.: PCT/SE2014/050927
§ 371 (c)(1),
(2) Date: Jan. 26, 2017

(87) PCT Pub. No.: WO2016/022050
PCT Pub. Date: Feb. 11, 2016

(65) Prior Publication Data
US 2017/0215118 A1    Jul. 27, 2017

(51) Int. Cl.
*H04W 36/00* (2009.01)
*H04W 36/22* (2009.01)

(52) U.S. Cl.
CPC ....... *H04W 36/0094* (2013.01); *H04W 36/22* (2013.01)

(58) Field of Classification Search
CPC . H04W 36/0094; H04W 36/22; H04W 28/08; H04W 36/0083
(Continued)

(56) References Cited

U.S. PATENT DOCUMENTS

2007/0232311 A1* 10/2007 Kuhn ............... H04W 36/22
455/436
2010/0267387 A1* 10/2010 Stephens ........... H04W 36/22
455/436
(Continued)

FOREIGN PATENT DOCUMENTS

| EP | 2 723 123 A1 | 4/2014 |
| WO | 2009064553 A1 | 5/2009 |

(Continued)

OTHER PUBLICATIONS

3GPP TS 36.423 V11.8.0 (Mar. 2014) 3rd Generation Partnership Project; Technical Specification Group Radio Access Network; Evolved Universal Terrestrial Radio Access Network (E-UTRAN); X2 Application Protocol (X2AP) (Release 11) Mar. 17, 2014 consisting of 144-pages.
(Continued)

*Primary Examiner* — Nathan Taylor
(74) *Attorney, Agent, or Firm* — Christopher & Weisberg, P.A.

(57) ABSTRACT

A method in a radio network node for determining whether a wireless device is a suitable candidate for handover to a target cell for load balancing reasons. The radio network node serves a source cell. The method includes determining a first level of coverage of the target cell based on a first measurement report. The method further includes storing measurement data obtained from a second measurement, being at least one of a layer 2 and a layer 1 measurement. The method further includes establishing a correlation between the determined first level of coverage and the stored
(Continued)

measurement data and updating statistical data based on the established correlation. The method further includes determining whether the wireless device is a suitable candidate for handover to the target cell for load balancing reasons, based on the updated statistical data.

18 Claims, 5 Drawing Sheets

(58) Field of Classification Search
USPC .......................................................... 455/436
See application file for complete search history.

(56) References Cited

U.S. PATENT DOCUMENTS

| | | | | |
|---|---|---|---|---|
| 2011/0039564 A1* | 2/2011 | Johnstone | ............. | H04W 36/22 |
| | | | | 455/436 |
| 2011/0128862 A1* | 6/2011 | Kallin | ................... | H04W 36/22 |
| | | | | 370/245 |
| 2012/0314569 A1* | 12/2012 | Liu | ................... | H04W 36/0094 |
| | | | | 370/230 |
| 2014/0038634 A1* | 2/2014 | Eskicioglu | ............ | H04W 48/18 |
| | | | | 455/456.1 |
| 2014/0235245 A1* | 8/2014 | Wegmann | ......... | H04W 36/0083 |
| | | | | 455/436 |
| 2014/0378144 A1* | 12/2014 | Legg | ..................... | H04W 24/10 |
| | | | | 455/437 |
| 2015/0208280 A1* | 7/2015 | Lorca Hernando | ... | H04W 16/08 |
| | | | | 370/235 |
| 2015/0289169 A1* | 10/2015 | Capdevielle | .......... | H04W 24/02 |
| | | | | 455/436 |
| 2015/0327018 A1* | 11/2015 | Rehnberg | .............. | H04W 64/00 |
| | | | | 370/252 |

FOREIGN PATENT DOCUMENTS

| | | |
|---|---|---|
| WO | 2013020598 A1 | 2/2013 |
| WO | 2013131553 A1 | 9/2013 |
| WO | 2013191602 A1 | 12/2013 |

OTHER PUBLICATIONS

3GPP TS 36.213 V11.7.0 (Jun. 2014) 3rd Generation Partnership Project; Technical Specification Group Radio Access Network; Evolved Universal Terrestrial Radio Access (E-UTRA); Physical Layer Procedures (Release 11) Jul. 3, 2014 consisting of 182-pages.
3GPP TS 36.331 V11.8.0 (Jun. 2014) 3rd Generation Partnership Project; Technical Specification Group Radio Access Network; Evolved Universal Terrestrial Radio Access (E-UTRA); Radio Resource Control (RRC); Protocol Specification (Release 11) Jul. 4, 2014 consisting of 354-pages.
International Search Report and Written Opinion dated Mar. 23, 2015 for International Application Serial No. PCT/SE2014/050927, International Filing Date: Aug. 8, 2014 consisting of 13-pages.
Supplementary European Search Report dated Jul. 18, 2017 for European Application No. EP14899389, International Filing date Aug. 8, 2014, consisting of 3-pages.
3GPP TSG-RAN WG3 #80 R3-130819, Title: "Analysis of SON for UE type", Conference Location and Date: Fukuoka, Japan, May 20-24, 2013, consisting of 4-pages.

* cited by examiner

RADIO NETWORK NODE, AND METHOD FOR DETERMINING WHETHER A WIRELESS DEVICE IS A SUITABLE CANDIDATE FOR HANDOVER TO A TARGET CELL FOR LOAD BALANCING REASONS

CROSS-REFERENCE TO RELATED APPLICATIONS

This application is a submission under 35 U.S.C. § 371 for U.S. National Stage Patent Application of International Application Number: PCT/SE2014/050927, filed Aug. 8, 2014 and entitled "RADIO NETWORK NODE, AND METHOD FOR DETERMINING WHETHER A WIRELESS DEVICE IS A SUITABLE CANDIDATE FOR HANDOVER TO A TARGET CELL FOR LOAD BALANCING REASONS," the entirety of which is incorporated herein by reference.

TECHNICAL FIELD

Embodiments herein relate to a radio network node and a method in the radio network node. In particular they relate to determining whether a wireless device is a suitable candidate for handover to a target cell for load balancing reasons.

BACKGROUND

Communication devices such as wireless devices are also known as e.g. user equipments (UE), mobile terminals, wireless terminals, and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cell areas, wherein each cell area being served by an network node. A cell is the geographical area where radio coverage is provided by the network node.

The network node may e.g. be a base station such as a Radio Base Station (RBS), eNB, eNodeB, NodeB, node B, or BTS (Base Transceiver Station), depending on the technology and terminology used. The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the wireless terminals within range of the network node. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

With radio networks like those used for LTE and other cellular technologies becoming more complex, network planning needs to be made easier—planning, configuration, management, optimization and healing all need to be automated to bring improvements. As a result, the concept of Self-Organizing Networks (SON) is growing in interest and use. With the networks themselves being able to monitor performance, they can optimize themselves to be able to provide the optimum performance. The self-organization capability of a mobile network mainly includes three aspects: self-configuration, self-optimization, and self-healing.

Self-optimization refers to the ability of the network to adapt itself to surrounding conditions and optimize its performance based on coverage, capacity, handover between cells, and interference. Two key SON functions are Load Balancing (LB) and interference mitigation. With LB, traffic load, such as wireless devices, may be moved between cells and frequencies with the aim to distribute traffic load evenly in the network. Overloaded network cells may thereby offload excess traffic to low-loaded adjacent cells.

When a certain cell is over-loaded, a number of wireless devices connected to that cell, the source cell, might need to be moved to neighboring cells. Before selecting a target cell to which a wireless device should be moved for load balancing reasons, the wireless device needs to perform measurements for neighboring cells. These measurements are sometimes referred to as UE measurements. A wireless device may be configured to perform inter-frequency measurements in order to search for a target cell within the same Radio Access Technology (RAT) as the RAT of the source cell. A wireless device may also be configured to perform Inter RAT (IRAT) measurements in order to search for a target cell within a RAT different from the one of the source cell.

The network may select a number of wireless devices to perform such measurements for neighboring cells. This selection of wireless devices may be made at random, which is in-efficient in many scenarios and might lead to non-optimal network performance such as lower end-user and system throughput, higher latency and lower utilization of network resources.

SUMMARY

It is therefore an object of embodiments herein to enhance the performance in a wireless communications network in which load balancing is used.

According to a first aspect of embodiments herein, the object is achieved by a method in a radio network node for determining whether a wireless device is a suitable candidate for handover to a target cell for load balancing reasons. The radio network node serves a source cell to which the wireless device is connected. The radio network node determines a first level of coverage of the target cell based on a first measurement report. The radio network node stores measurement data obtained from a second measurement, which second measurement relates to the source cell, and which second measurement is at least one of a layer 2 measurement and a layer 1 measurement. The radio network node establishes a correlation between the determined first level of coverage of the target cell and the stored measurement data. The radio network node updates statistical data based on the established correlation. The radio network node determines whether the wireless device is a suitable candidate for handover to the target cell for load balancing reasons, based on the updated statistical data.

According to a second aspect of embodiments herein, the object is achieved by a radio network node for determining whether a wireless device is a suitable candidate for handover to a target cell for load balancing reasons. The radio network node serves a source cell to which the wireless device is connected. The radio network node is configured to determine a first level of coverage of the target cell based on a first measurement report. The radio network node is configured to store measurement data obtained from a second measurement, which second measurement relates to the source cell, and which second measurement is at least one of a layer 2 measurement and a layer 1 measurement. The radio network node is configured to establish a correlation between the determined first level of coverage of the target cell and the stored measurement data. The radio network node is configured to update statistical data based on the established correlation. The radio network node is configured to determine whether the wireless device is a suitable candidate for handover to the target cell for load balancing reasons, based on the updated statistical data.

An advantage with embodiments herein is that an improved way of determining whether a wireless device is a suitable candidate for handover to a certain target cell, for balancing reasons, is introduced. When the radio network node has decided that a wireless device is a suitable candidate for handover to a certain target cell for load balancing reasons, based on statistical data, according to embodiments herein, the radio network node may configure the wireless device to perform a measurement regarding a level of coverage of the target cell, in order to prepare a possible handover of the wireless device to the target cell. Such measurement, referred to as a UE measurement, is either an inter frequency measurement or an IRAT measurement.

The probability that the then measured level of coverage of the target cell indicates that the target cell is suitable for handover of the wireless device is then higher than if the radio network node randomly selects a wireless device to perform measurements for a level of coverage of the target cell.

In this way the number of UE measurements performed by wireless devices for load balancing reasons is decreased, as compared to existing solutions, in which wireless devices to perform UE measurements are selected by means of random based algorithms. A decreased number of UE measurements has a positive impact on the wireless device's battery lifetime, end-user performance, such as throughput and latency, and on the processing capacity of the RAN. The performance of the wireless communications network is thereby improved. Furthermore, a reduced number of UE measurements reduces the time needed for load balancing, which also leads to an improved performance of the wireless communications network.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

When a wireless communications network has a task which needs to be fulfilled by letting wireless devices measure for neighbor cells, a wireless device selection algorithm must be used. This wireless device selection algorithm can be based on random selection of wireless devices. In many occasions the network would like to find wireless devices which have a certain cell as the preferred choice on a specific frequency.

The problem with random selection of wireless devices is that when wireless devices shall be found for a certain cell or group of cells, the probability of finding these are only related to coverage overlap of source and target cell and statistic distribution of the wireless devices in this coverage area. This might be in-efficient in many scenarios.

For example, in case of scenarios of heterogenous networks (HetNets) with small cells covering only a part of the macro source cell, it is difficult to find wireless devices which currently are in the coverage area of the small cell. Another such example is where a non-co-located neighbor cell only overlaps a part of the source cell.

Measurements performed by a wireless device, generally denoted UE measurements, are started by the network when the network finds it suitable to move wireless devices to neighbor cells. Such UE measurements can be event based as defined in 3GPP TS 36.331 3GPP, V 12.2.0, Chapter 5.5, by using for example events A3, A4 or A5.

Traffic load, such as wireless devices, can be moved between cells and frequencies by the network with the aim to evenly distribute traffic load in the network. This concept, called load balancing, is used for example to improve utilization of network resources. The move of a wireless device is typically done by letting the wireless device measure for neighbor cells before a target cell to move it to is selected. Load balancing is described in 3GPP 36.423, V 12.2.0, Chapters 7, 8.3.6 and 8.3.7.

A problem with random selection of wireless devices to perform UE measurements is the inefficiency of the selection of wireless devices. An inefficient selection of wireless device means inefficiency in load balancing and thereby not possible to distribute the traffic load evenly within the network. This in terms, lead to non-optimal network performance such as lower end-user and system throughput, higher latency and lower utilization of network resources.

Figure 1:
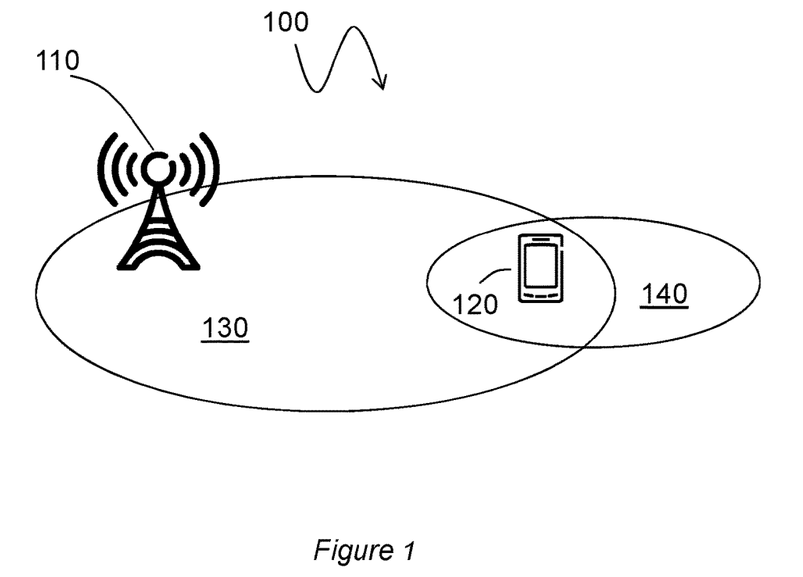
FIG. 1 schematically illustrates embodiments of a wireless communications network.

FIG. 1 depicts an example of a wireless communications network 100 according to a first scenario in which embodiments herein may be implemented. The wireless communications network 100 is a wireless communication network such as an LTE-Advanced network. Embodiments herein may also be implemented in other networks such as WCDMA and GSM networks. Embodiments herein are applicable to inter-RAT scenarios as well as intra-RAT scenarios.

The wireless communications network 100 depicted in FIG. 1 comprises a radio network node 110. The radio network node 110 may be a transmission point such as a radio base station, for example an eNB, an eNodeB, or an Home Node B, an Home eNode B or any other network node capable to serve a wireless device such as a user equipment or a machine type communication device in a wireless communications network. The network node may also act as a master node to one or more secondary network nodes, where a secondary node also serves a wireless device.

The network node 110 provides radio coverage to one or several cells by means of one or several carriers or component carriers.

A number of wireless devices operates in the wireless communications network 100, whereof one, a wireless device 120 is depicted in FIG. 1. The wireless device 120 is served by a source cell 130, to which the radio network node 110 provides radio coverage.

The wireless device 120 may e.g. be a user equipment, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network. Please note the term wireless device used in this document also covers other wireless devices such as Machine to machine (M2M) devices.

The wireless communications network further comprises a second cell 140, which is hereinafter denoted target cell 140. Embodiments herein address scenarios in which the target cell 140 belongs to the same RAT as the source cell 130, as well as scenarios in which the target cell 140 belongs to another RAT than the one of the source cell 130.

Figure 2:
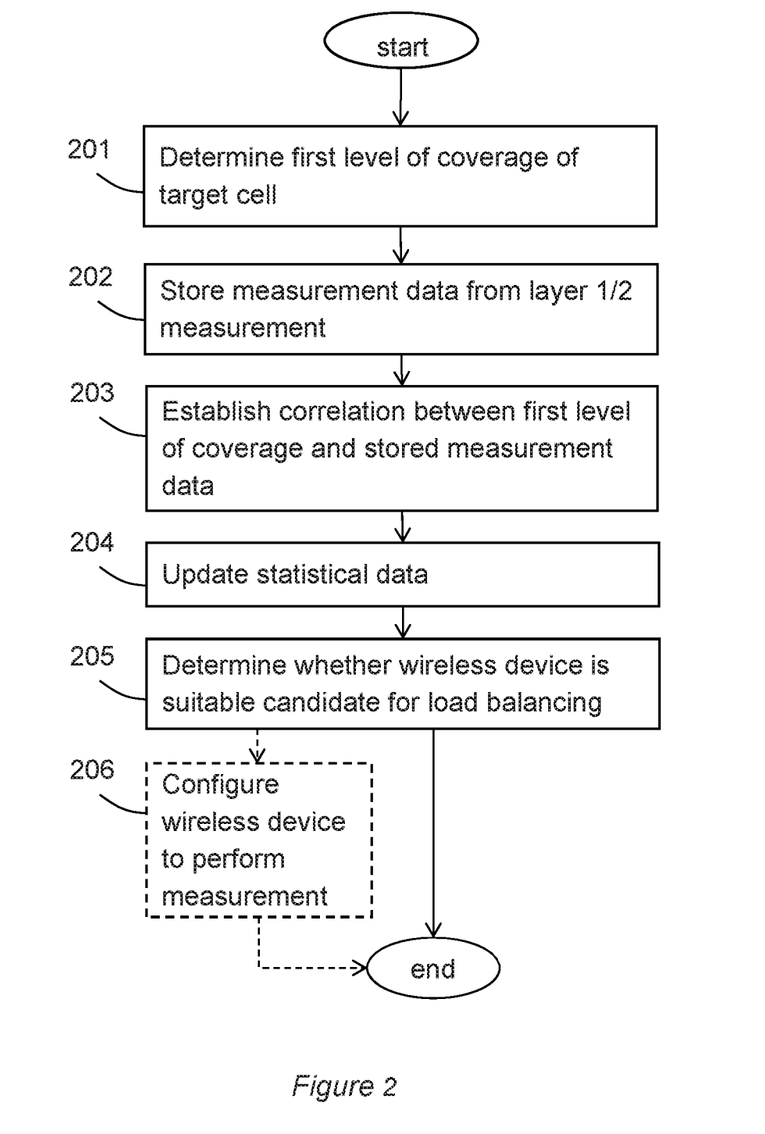
FIG. 2 is a flowchart depicting embodiments of a method in a radio network node.

Example embodiments of a method in a radio network node 110 for determining whether a wireless device 120 is a suitable candidate for handover to a target cell 140 for load balancing reasons, will now be described with reference to a flowchart depicted in FIG. 2. The method comprises the following actions, which actions may be taken in any suitable order. Dashed lines of some boxes in FIG. 2 indicate that the corresponding actions are not mandatory. First, the method is described in a general way, here as seen from the radio network node's 110 point of view, relating to FIG. 2. The method will then be described in more detail below.

Embodiments herein address scenarios in which the radio network node serves a source cell 130 to which the wireless device 120 is connected.

Action 201

According to embodiments herein the radio network node 110 will use statistical data in order to be able to determine if the wireless device 120 is a suitable candidate for handover to the target cell 140 for load balancing reasons. As further described below, the statistical data comprises information about how measured levels of coverage of the target cell 140 and measurement data received from other measurements are correlated.

In order to be able to build and update the statistical data, the radio network node 110 determines a first level of coverage of the target cell 140, based on a first measurement report.

As further described below, the first measurement report may be received from any wireless device which is connected to the radio network node 110, and served by the source cell 130 and which has been configured by the radio network node 110 to perform UE measurements.

Action 202

In order to be able to build and update the statistical data, the radio network node 110 further stores 202 measurement data obtained from a second measurement. The second measurement relates to the source cell 130. It is at least one of a layer 2 measurement and a layer 1 measurement.

The second measurement is further described below.

In some embodiments the second measurement is ongoing by default. An advantage with these embodiments is that the measurement data is then automatically available to the radio network node 110 and no extra Radio Resource Control (RRC) signaling is needed. Thereby battery lifetime of the wireless device 120 is improved and throughput degradation of the wireless device 120 is reduced.

Action 203

The radio network node 110 then establishes a correlation between the determined first level of coverage of the target cell 140 and the stored measurement data. The establishing of this correlation is further described below.

Action 204

The radio network node 110 updates statistical data based on the established correlation.

As further described below, the radio network node 110 may collect measurement data and build and update statistical data by means of repeating actions 201 to 204 several times relating to a plurality of wireless devices and potential target cells.

Action 205

When the radio network node shall select a wireless device for load balancing to be moved to a certain target cell, the source RAN looks into the assembled statistics from actions 201-204.

The radio network node 110 then decides whether the wireless device 120 is a suitable candidate for handover to the target cell 140 for load balancing reasons, based on the updated statistical data. This is further described below.

In some embodiments, the determining is further based on measurement data obtained from a third measurement, which third measurement relates to the source cell 130 and to the wireless device 120, and which third measurement is at least one of a layer 2 measurement and a layer 1 measurement. In some of these embodiments, the third measurement is ongoing by default. An advantage with these embodiments is that the measurement data is then automatically available to the radio network node 110 and no extra Radio Resource Control (RRC) signaling is needed. Thereby battery lifetime of the wireless device is improved and throughput degradation of the wireless device is reduced.

Action 206

In some embodiments, the radio network node 110 configures the wireless device 120 to perform a fourth measurement, which fourth measurement relates to a second level of coverage of the target cell 140, upon determining that the wireless device 120 is a suitable candidate for handover to the target cell 140 for load balancing reasons.

This fourth measurement is a UE measurement performed in order to determine if it is appropriate to move the wireless device 120 to the target cell 140 for load balancing reasons. This is further described below.

Exemplary embodiments of methods described in a general way above will now be described in more detail, relating to FIG. 3 and FIG. 4. The description below may refer to any embodiment above.

Figure 3:
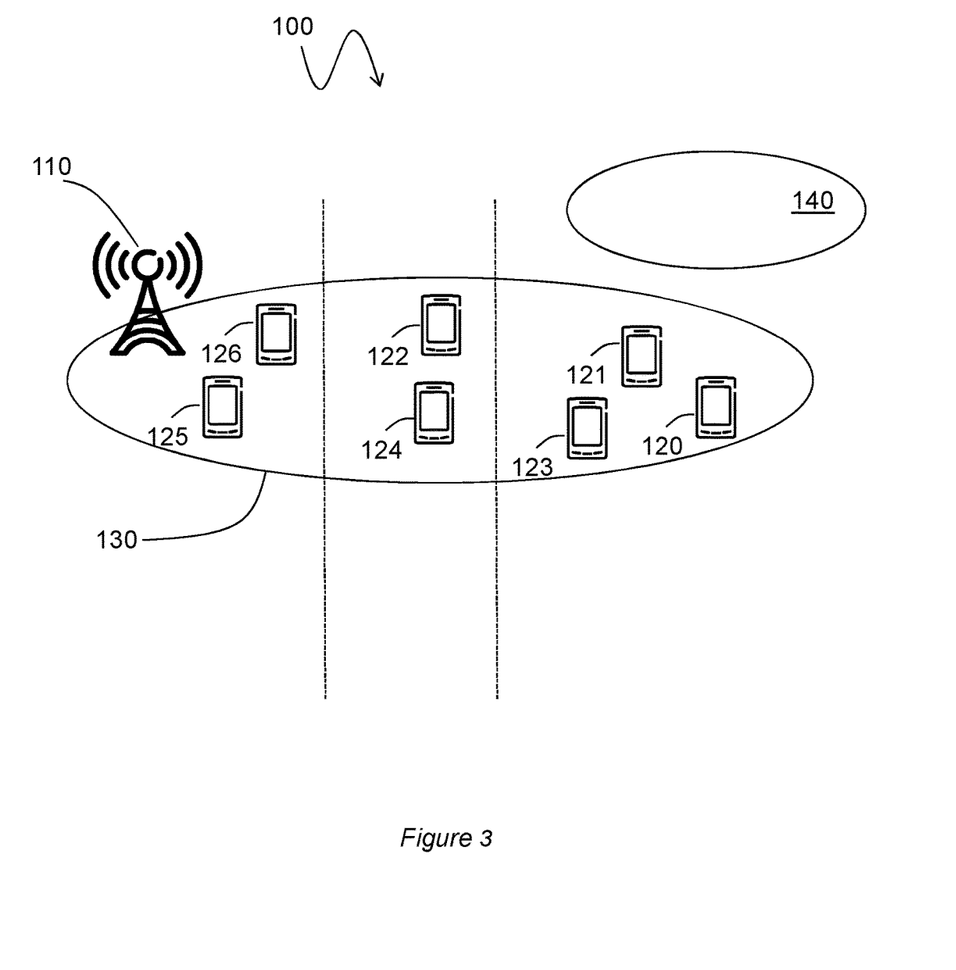
FIG. 3 schematically illustrates embodiments of a wireless communications network.

FIG. 3 illustrates an exemplary embodiment of a source cell 130 serving a plurality of wireless devices 120-126. In order to build the statistical data needed for the decision described in relation to action 205 above, the radio network node 110 may collect and analyze measurement data relating to some of the wireless devices 120-126 and to one or several neighboring cells, such as the cell 140 illustrated in FIG. 3.

The radio network node 110 may e.g. order a second wireless device 121 to perform UE measurements on a certain frequency in a certain RAT. The second wireless device 121 may then send a measurement report to the radio network node 110, which measurement report relates to a level of coverage of one or several neighboring cells, such as the target cell 140 illustrated in FIG. 3. This relates to action 201 above.

When the radio network node 110 receives the measurement, it fetches and stores layer 1 and/or layer 2 measurements of the current source cell's 110 for this second wireless device 121. This relates to action 202 described above. Hereinafter, layer 1 and layer 2 measurements are commonly denoted layer 1/2 measurements. Layer 1/2 measurements are source cell measurements.

The source cell's 130 layer 1/2 measurements, may be measurements that are ongoing by default, such as measurements relating to:
Timing Alignment, Timing Advance (TA),
Channel State Information (CSI) comprising e.g. Cell Quality Index (CQI),
Downlink or Uplink Pathloss
It could also be other type of measurements, such as:
Downlink or uplink signal strength,
Downlink or uplink signal quality,
Block Error Rate (BLER) downlink or BLER uplink.

CSI reporting is further described in 3GPP 36.213, V 12.2.0, Chapter 7.2.

The radio network node 110 updates the input data that the second wireless device 121 has found a certain target cell, e.g. target cell 140, when having certain source cell's layer 1/2 measurement values. This relates to actions 203 and 204 described above. In case there is a correlation between a measurement result and a probability of finding a certain target cell, then statistics for this correlation can be gathered, analyzed and used when selecting wireless devices to move to this target cell 140.

The radio network node 110 may apply filtering instantaneously or periodically in order to improve the collected input data and make it into statistically secured data.

The radio network node 110 may further repeat the steps described above in relation to FIG. 3 for several of the wireless devices 120-126, such that reliable statistical data is achieved.

The assembled data collected by repeating the steps described above in relation to FIG. 3 for several wireless devices 120-126 are described below in a first example, Example 1. In Example 1, a probability to find the target cell 140 in relation to the current Timing Advance value is calculated and used.

TABLE 1

Example 1 of relation between measurement and probability

| Timing Advance value | Probability to find target cell 140 |
|---|---|
| 0 | 1% |
| 1 | 10% |
| 2 | 60% |

In Example 1, a wireless device shall be moved to target cell 140. In such case it is more probable that the UE will find target cell 140 in case it currently has TA value=2, compared to 0 or 1. Relating to the example illustrated in FIG. 3, wireless devices 125 and 126 may e.g. have a TA value of 0, whereas, wireless devices 122 and 124 have a TA value of 1 and wireless devices 120, 121 and 123 have a TA value of 2.

In another example, Example 2, a probability to find a second target cell, not illustrated, in relation to the current CQI and TA is calculated and used.

TABLE 2

Example 2 of relation between measurement and probability In the above

| Timing Advance value | CQI | Probability to find second target cell |
|---|---|---|
| 0 | 0 | 0% |
| 0 | 5 | 10% |
| 0 | 15 | 5% |

In Example 2 a wireless device shall be moved to the second target cell. In such case it is more probable that the wireless device will find the second target cell in case it currently has TA value=0 and CQI=5, compared to 0 or 15.

When the radio network node 110 needs to select a wireless device, such as the wireless device 120, for load balancing to be moved to a certain target cell, such as the target cell 140, the radio network node 110 looks into the assembled statistics the steps described above in relation to FIG. 3.

The radio network node 110 selects a certain wireless device based on the statistics and on the current source cell's layer 1/2 measurements of the currently connected wireless devices. This relates to action 205 described above. The third measurement may be the same type of measurement data as the second measurement. That is, if the second measurement, and thereby the statistics assembled, relates to a TA value, the third measurement may also relate to a TA value. Typically a wireless device with high probability to find the specified target cell is prioritized over a wireless device with lower probability. The radio network node 110 may select a wireless device 120 to be processed further in load balancing to target cell 140, if it determines that the wireless device 120 is a suitable candidate for handover to the target cell 140 for load balancing reasons, based on the statistics and on the current source cell's layer 1/2 measurements of the currently connected wireless devices. This relates to action 205 described above.

A wireless device that is selected in this way may be further processed in load balancing. The radio network node 110 may then configure the wireless device 120 to perform UE measurements relating to the actual target cell 140. This relates to action 206 described above. The radio network node 110 may e.g. send a RRC CONNECTION RECONFIGURATION message to the wireless device 120 in order to initiate appropriate UE measurements. The probability that the wireless device 120 selected in this way will report measurement results showing that the target cell 140 is appropriate for handing over of the wireless device 120 for load balancing reasons is higher than if the radio network node 110 selects a wireless device 120 based on a random based algorithm.

This means that the number of UE measurements, needed in order to find a certain number of traffic load units, such as wireless devices, from a source cell to a certain target cell, may be lower when applying embodiments herein.

UE measurements, which are layer 3 measurements, are preferably kept at a minimum, since they have a negative impact on the wireless device's battery lifetime, may have a negative impact on end-user performance such as throughput and latency, and have a negative impact on processing capacity of the source RAN.

Embodiments herein thereby increases efficiency of load balancing. The efficiency of load balancing is especially important considering HetNet scenarios. In such scenarios load balancing shall move traffic load efficiently to multiple small cells and still keep number of UE measurements at a minimum.

The embodiments herein are applicable to all inter-RAT cases (for example LTE, WCDMA and GSM) as well as intra-RAT cases.

In an illustrating example, consider that a certain source cell 130 is overloaded. Assume that five of the wireless devices currently served by the source cell therefore need to be handed over to a target cell 140. The radio network node 110 will then configure a number of wireless devices to perform UE measurements for load balancing reasons. Each of these configurations relates to action 206 above. If the radio network node 110 randomly selects wireless devices to perform such measurements, it might take e.g. fifteen wireless devises to find five wireless devices reporting that the target cell 140 is a suitable target cell for them. If a selection method based on decisions whether a certain wireless device is a suitable candidate for handover to the target cell 140 for load balancing reasons, according to embodiments herein, the radio network node 110 may need to configure a lower number of wireless devices, e.g. ten, in order to find five wireless devices reporting that the target cell 140 is a suitable target cell for them. Thereby the number of UE measurements is reduced.

Figure 4:
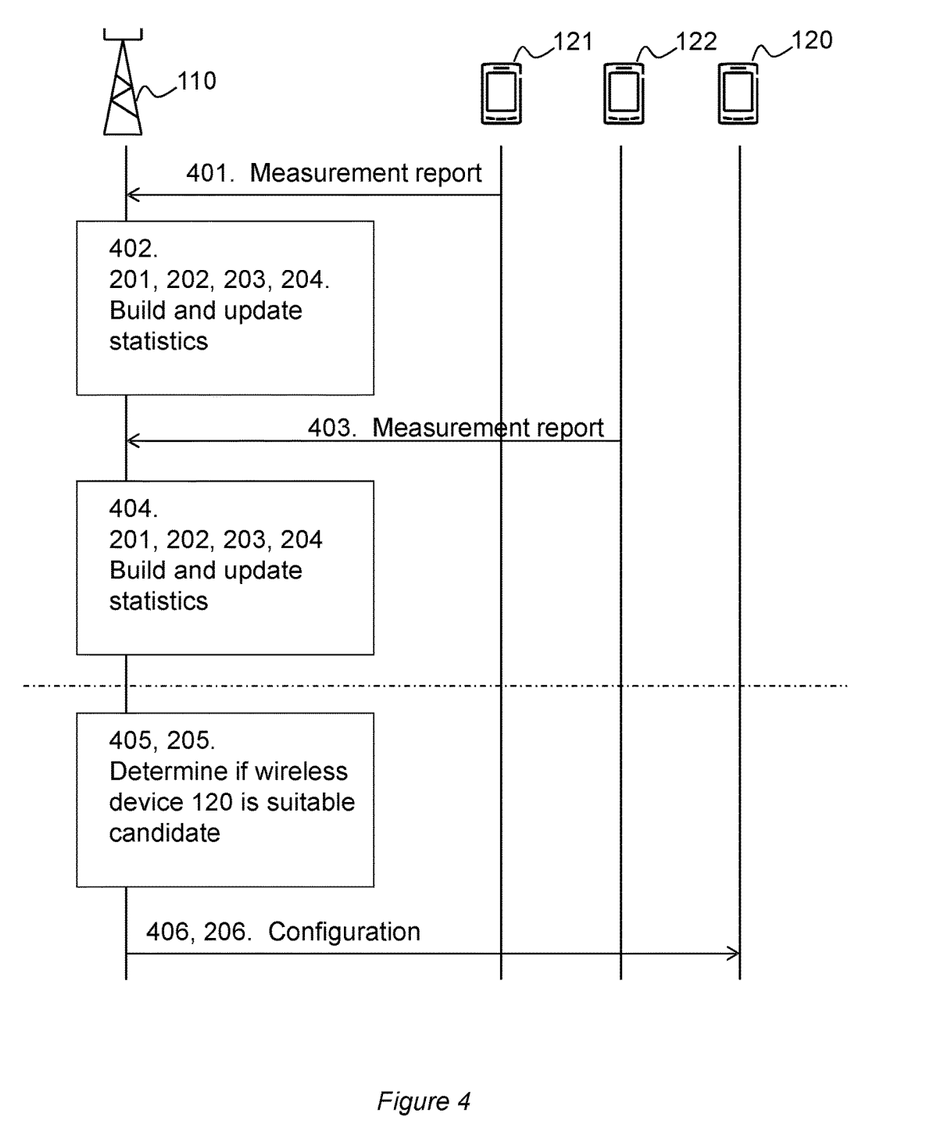
FIG. 4 is a combined signaling diagram and flowchart illustrating embodiments in a wireless network.

FIG. 4 is a combined flowchart and signaling diagram, further illustrating the steps described above in relation to FIG. 3.

Action 401

The radio network node 110 may e.g. receive a measurement report from the second wireless device 121, which wireless device has been configured to perform UE measurements on a certain frequency in a certain RAT. The measurement report relates to a level of coverage of one or several neighboring cells, such as the target cell 140 illustrated in FIG. 3.

Action 402

The radio network node 110 will then build statistical data. In order to do this, the radio network node 110 may determine a level of coverage of the target cell 140 based on this measurement report. This relates to action 201 described above. In order to build the statistical data the radio network node 110 further stores measurement data obtained from a layer 1/2 measurement, as described above in relation to FIG. 3. This relates to action 202 described above. The radio network node 110 further establishes a correlation between the determined level of coverage of the target cell 140 and the stored measurement data, as described above in relation to FIG. 3. This relates to action 203 above. The radio network node 110 further updates statistical data based on the established correlation. This relates to action 204 above.

Actions 403, 404

As described above in relation to FIG. 3, the radio network node 110 will continue building and updating the statistical data by means of repeating steps 401 and 402 above, for other wireless devices, such as a third wireless device 122.

Action 405

Later on, when the radio network node 110 needs to select a wireless device, such as the wireless device 120, for load balancing to be moved to a certain target cell, such as the target cell 140, the radio network node 110 looks into the assembled statistics achieved in actions 401-404 described above and is thereby able to determine whether the wireless device 120 is a suitable candidate for handover to the target cell 140 for load balancing reasons, based on the updated statistical data. This relates to action 205 described above.

Action 406

A wireless device that is selected in this way may be further processed in load balancing. The radio network node 110 may then configure the wireless device 120 to perform UE measurements relating to the actual target cell 140. This relates to action 206 described above.

Figure 5:
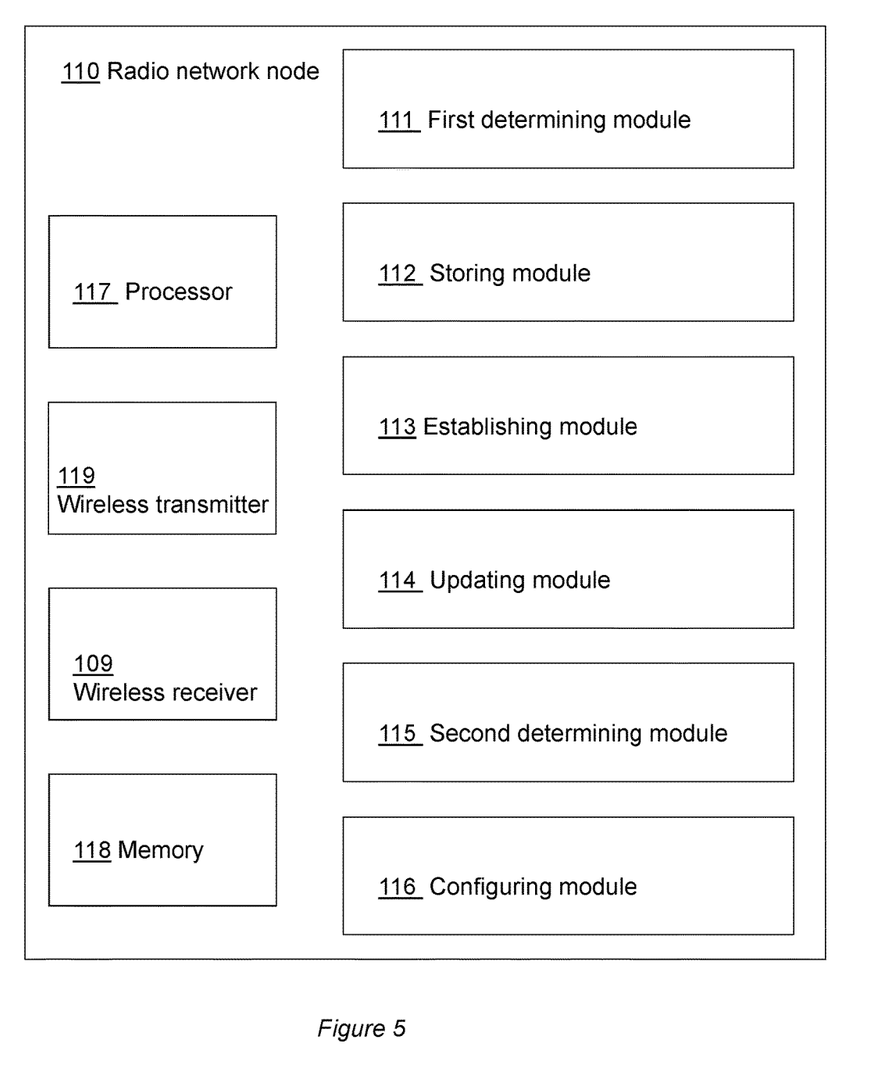
FIG. 5 is a schematic block diagram illustrating embodiments of radio network node.

The radio network node 110 configured to perform the method actions for determining whether a wireless device 120 is a suitable candidate for handover to a target cell 140 for load balancing reasons as described above in relation to FIG. 2, is depicted in FIG. 5.

The radio network node 110 serves a source cell 130 to which the wireless device 120 is connected.

The radio network node 110 is configured to determine a first level of coverage of the target cell 140 based on a first measurement report, e.g. by means of a first determining module 111. The first determining module 111 may be a processor 117 of the radio network node 110. The first measurement report may be received by a wireless receiver 109 of the radio network node 110.

The radio network node 110 is further configured to store measurement data obtained from a second measurement, e.g. by means of a storing module 112. The storing module may be a memory 118 of the radio network node 110. The second measurement relates to the source cell 130. The second measurement is at least one of a layer 2 measurement and a layer 1 measurement. In some embodiments, the second measurement is ongoing by default.

The radio network node 110 is further configured to establish a correlation between the determined first level of coverage of the target cell 140 and the stored measurement data, e.g. by means of an establishing module 113. The establishing module 113 may be a processor 117 of the radio network node 110.

The radio network node 110 is further configured to update statistical data based on the established correlation, e.g. by means of an updating module 114. The updating module may be a processor 117 of the radio network node 110.

The radio network node 110 is further configured to determine, e.g. by means of a second determining module 115, whether the wireless device 120 is a suitable candidate for handover to the target cell 140 for load balancing reasons, based on the updated statistical data. The second determining module 115 may be a processor 117 of the radio network node 110. In some embodiments, the radio network node 110 is further configured to determine whether the wireless device 120 is a suitable candidate for handover to the target cell 140 for load balancing reasons, based on measurement data obtained from a third measurement, which third measurement relates to the source cell 130 and to the wireless device 120, and which third measurement is at least one of a layer 2 measurement and a layer 1 measurement. In some embodiments, the third measurement is ongoing by default.

In some embodiments, upon determining that the wireless device 120 is a suitable candidate for handover to the target cell 140 for load balancing reasons, the radio network node 110 is further configured to, configure, e.g. by means of a configuring module 116, the wireless device to perform a fourth measurement, which fourth measurement relates to a second level of coverage of the target cell 140. The configuring module 116 may comprise a wireless transmitter 119 of the radio network node 110.

The embodiments herein for determining whether a wireless device 120 is a suitable candidate for handover to a target cell 140 for load balancing reasons may be implemented through one or more processors, such as a processor 117 in the radio network node 110 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the radio network node 110. One such carrier may be in the form of a CD ROM disc. It is however feasible with other data carriers such as a memory stick. The computer program code may furthermore be provided as pure program code on a server and downloaded to the radio network node 110.

The radio network node 110 may further comprise a memory 118 comprising one or more memory units. The memory 118 is arranged to be used to store indications, metrics, determined measures of the downlink interference, cell parameters, configurations, and applications to perform the methods herein when being executed in the radio network node 110.

Those skilled in the art will also appreciate that the first determining module 111, storing module 112, establishing module 113, updating module 114, second determining module 115, and configuring module 116 described above may refer to a combination of analog and digital circuits, and/or one or more processors configured with software and/or firmware, e.g. stored in a memory, that when executed by the one or more processors such as the processor 117 as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a radio network node for determining whether a wireless device is a suitable candidate for handover to a target cell for load balancing reasons, the radio network node serving a source cell to which the wireless device is connected, the method comprising:
   determining a first level of coverage of the target cell based on a first measurement report;
   storing measurement data obtained from a second measurement generated by the wireless device, which second measurement relates to the source cell, and which second measurement is at least one of a layer 2 measurement and a layer 1 measurement;
   establishing a correlation between the determined first level of coverage of the target cell and the stored measurement data;
   updating statistical data based on the established correlation; and
   determining whether the wireless device is a suitable candidate for handover to the target cell for load balancing reasons based on:
      the updated statistical data; and
      measurement data obtained from a third measurement, which third measurement relates to the source cell and to the wireless device, and which third measurement is at least one of a layer 2 measurement and a layer 1 measurement.

2. The method according to claim 1, further comprising:
   upon determining that the wireless device is a suitable candidate for handover to the target cell for load balancing reasons, configuring the wireless device to perform a fourth measurement, which fourth measurement relates to a second level of coverage of the target cell.

3. The method according to claim 2, wherein the second measurement is ongoing by default.

4. The method according to claim 3, wherein the third measurement is ongoing by default.

5. The method according to claim 2, wherein the third measurement is ongoing by default.

6. The method according to claim 1, wherein
   the second measurement is ongoing by default.

7. The method according to claim 6, further comprising:
   upon determining that the wireless device is a suitable candidate for handover to the target cell for load balancing reasons, configuring the wireless device to perform a fourth measurement, which fourth measurement relates to a second level of coverage of the target cell.

8. The method according to claim 6, wherein the third measurement is ongoing by default.

9. The method according to claim 1, wherein
   the third measurement is ongoing by default.

10. A radio network node for determining whether a wireless device is a suitable candidate for handover to a target cell for load balancing reasons, the radio network node serving a source cell to which the wireless device is connected, the radio network node being configured to:

determine a first level of coverage of the target cell based on a first measurement report;

store measurement data obtained from a second measurement generated by the wireless device, which second measurement relates to the source cell, and which second measurement is at least one of a layer 2 measurement and a layer 1 measurement;

establish a correlation between the determined first level of coverage of the target cell and the stored measurement data;

update statistical data based on the established correlation; and determine whether the wireless device is a suitable candidate for handover to the target cell for load balancing reasons based on:
   the updated statistical data; and
   measurement data obtained from a third measurement, which third measurement relates to the source cell and to the wireless device, and which third measurement is at least one of a layer 2 measurement and a layer 1 measurement.

11. The radio network node according to claim 10, further being configured to:
   upon determining that the wireless device is a suitable candidate for handover to the target cell for load balancing reasons, configure the wireless device to perform a fourth measurement, which fourth measurement relates to a second level of coverage of the target cell.

12. The radio network node according to claim 11, wherein the second measurement is ongoing by default.

13. The radio network node according to claim 12, wherein the third measurement is ongoing by default.

14. The radio network node according to claim 10, wherein the second measurement is ongoing by default.

15. The radio network node according to claim 14, further being configured to:
   upon determining that the wireless device is a suitable candidate for handover to the target cell for load balancing reasons, configure the wireless device to perform a fourth measurement, which fourth measurement relates to a second level of coverage of the target cell.

16. The radio network node according to claim 15, wherein the third measurement is ongoing by default.

17. The radio network node according to claim 14, wherein the third measurement is ongoing by default.

18. The radio network node according to claim 10, wherein the third measurement is ongoing by default.

* * * * *